(12) United States Patent
Golka

(10) Patent No.: US 10,578,190 B2
(45) Date of Patent: Mar. 3, 2020

(54) DRIVETRAIN MODULE FOR A MOTOR VEHICLE

(71) Applicant: MAN Truck & Bus AG, München (DE)

(72) Inventor: Markus Golka, Nürnberg (DE)

(73) Assignee: MAN TRUCK & BUS AG, München (DE)

( * ) Notice: Subject to any disclaimer, the term of this patent is extended or adjusted under 35 U.S.C. 154(b) by 319 days.

(21) Appl. No.: 15/414,037

(22) Filed: Jan. 24, 2017

(65) Prior Publication Data

US 2017/0211659 A1 Jul. 27, 2017

(30) Foreign Application Priority Data

Jan. 26, 2016 (DE) .................. 10 2016 000 835

(51) Int. Cl.
*H02K 7/02* (2006.01)
*F16F 15/315* (2006.01)
*H02K 7/00* (2006.01)

(52) U.S. Cl.
CPC ......... *F16F 15/3153* (2013.01); *H02K 7/006* (2013.01)

(58) Field of Classification Search
CPC ........ H02K 7/02; H02K 7/006; H02K 21/222; F16F 15/3153
See application file for complete search history.

(56) References Cited

U.S. PATENT DOCUMENTS

| | | | |
|---|---|---|---|
| 633,857 A | 9/1899 | Lamme | |
| 2,963,599 A * | 12/1960 | Gaylor | H02K 1/2786 310/153 |
| 4,227,108 A * | 10/1980 | Washizu | H02K 1/04 310/214 |
| 4,361,953 A * | 12/1982 | Peachee | H02K 5/15 29/525.02 |
| 4,389,589 A | 6/1983 | Schustek | |
| 5,118,978 A * | 6/1992 | Matsumoto | F02B 75/16 123/149 D |
| 5,172,006 A | 12/1992 | Suzuki et al. | |

(Continued)

FOREIGN PATENT DOCUMENTS

| | | |
|---|---|---|
| CN | 1860060 A | 11/2006 |
| DE | 3037793 A1 | 5/1982 |

(Continued)

OTHER PUBLICATIONS

Extended European search report issued in corresponding application No. 16205061.1 dated Jun. 26, 2017.

(Continued)

*Primary Examiner* — Dang D Le
(74) *Attorney, Agent, or Firm* — Weber Rosselli & Canon LLP

(57) ABSTRACT

A drivetrain module for a motor vehicle including a flywheel connectable to a crankshaft, and a crankshaft starter-generator which has a rotor. The flywheel has a multiplicity of fastening points. In a region of magnetically soft action of the rotor, a multiplicity of passage openings is arranged in each case so as to be spatially assigned to the fastening points of the flywheel. Through the passage openings, pin-like fastening elements interact with the respectively assigned fastening points for the rotationally conjoint connection of rotor and flywheel.

13 Claims, 8 Drawing Sheets

(56) References Cited

U.S. PATENT DOCUMENTS

| | | | |
|---|---|---|---|
| 6,225,722 B1* | 5/2001 | Rupp | H02K 21/22 |
| | | | 310/91 |
| 6,388,348 B2 | 5/2002 | van Heyden et al. | |
| 7,012,349 B1* | 3/2006 | Walker | H02K 1/2786 |
| | | | 310/152 |
| 2001/0043019 A1 | 11/2001 | Heyden et al. | |
| 2002/0033605 A1 | 3/2002 | Shimizu et al. | |
| 2008/0278016 A1 | 11/2008 | Sorachi et al. | |
| 2014/0015354 A1 | 1/2014 | Satou et al. | |

FOREIGN PATENT DOCUMENTS

| | | |
|---|---|---|
| DE | 3227810 A1 | 1/1984 |
| DE | 19900584 A1 | 7/2000 |
| DE | 19927261 A1 | 12/2000 |
| DE | 102013208856 A1 | 11/2014 |
| DE | 102013018720 A1 | 5/2015 |
| EP | 1669287 A1 | 6/2006 |
| JP | H0730584 U | 6/1995 |

OTHER PUBLICATIONS

German search report issued in corresponding application No. 102016000835.0 dated Dec. 6, 2016.
First Office Action issued in Chinese Patent Application No. 201710025142.7 dated Nov. 5, 2019, with English translation, 13 pages.

* cited by examiner

800

DRIVETRAIN MODULE FOR A MOTOR VEHICLE

BACKGROUND

1. Technical Field

The present disclosure relates to a drivetrain module for a motor vehicle. In particular, a drivetrain module having a flywheel and having a crankshaft starter-generator, and a corresponding motor vehicle, are described.

2. Description of Related Art

To permit the initial mixture formation, ignition and combustion in an internal combustion engine, internal combustion engines are brought to a minimum rotational speed by way of the external mechanical drive of a starter. For this purpose, drivetrain modules are known from the prior art in which electrically operated crankshaft starter-generators are arranged between internal combustion engine and gearbox. Aside from the starter function, the crankshaft starter-generator can, during a braking process, recuperate energy by virtue of the crankshaft, decoupled from the internal combustion engine, driving the crankshaft starter-generator. By virtue of the recuperated energy being converted in the crankshaft starter-generator in order to assist the internal combustion engine during starting and acceleration, fuel consumption can be reduced. Furthermore, the crankshaft starter-generator may serve as a generator replacement during driving operation.

FIG. 1A shows, in the upper half of the figure, a section, and in the lower half of the figure, a view, of a conventional drivetrain module 10 for a motor vehicle. The image plane is parallel to an axis of rotation 1 of a crankshaft. A drivetrain module 10 of this type is known from the laid-open specification DE 10 2013 018 720 A1. The conventional drivetrain module 10 comprises a flywheel 2, which is connected to the crankshaft, and a rotor 4, which bears in frictionally locking fashion against a web 3 integrally formed on the flywheel 2. A shell surface of the web 3 forms a press-fit seat 5 onto which a radially internally situated fit surface 6 of the rotor 4 is pressed, as shown in the perspective illustration of FIG. 1B. Therefore, an axial length of the web 3 must correspond at least to the axial length of the rotor 4. The exploded drawing of FIG. 1C shows the flywheel 3 and rotor 4 with exposed press-fit seat 5 and fit surface 6. The flywheel 2 comprises a starter toothed ring 8.

The mass moment of inertia is thereby increased. The fuel saving is adversely influenced by the increased mass moment of inertia.

A disadvantage of this is that the flywheel must have an additional attachment surface which is at least the length of the rotor.

SUMMARY

One aspect of the present disclosure is directed to reducing the moment of inertia arising from the crankshaft starter-generator.

According to one aspect, a drivetrain module for a motor vehicle is provided. Advantageous embodiments and uses are the subject of the dependent claims, and will be discussed in more detail below, in part with reference to the figures.

The drivetrain module includes a flywheel, which is connected or connectable to the crankshaft, and a crankshaft starter-generator. The flywheel has a multiplicity of fastening points. The crankshaft starter-generator comprises a rotor. In a region of magnetically soft action of the rotor, a multiplicity of passage openings is arranged in each case so as to be spatially assigned to the fastening points of the flywheel. Through the passage openings, pin-like fastening elements interact with the respectively assigned fastening points for the purposes of rotationally conjointly connecting the rotor and flywheel.

Exemplary embodiments of the drivetrain module can, by way of the direct connection of the flywheel and of the rotor region of magnetically soft action, reduce the moment of inertia for a rotation of the crankshaft in relation to conventional connecting technologies.

The rotor may be connected rotationally conjointly to the crankshaft by way of the flywheel. A direct coupling of the rotor to the crankshaft can be dispensed with. The rotor may be mounted together with the flywheel by way of the rotationally conjoint connection. A dedicated rotational mounting of the rotor can be dispensed with.

The rotor may be of closed ring-shaped form. The rotor may be of closed encircling form about the axis of rotation of the crankshaft. The rotor may be arranged in encircling fashion about the axis of rotation of the crankshaft without intersecting said axis of rotation. A radially inner surface of the rotor may deviate from a circular cylindrical shell surface. A fit surface on the radially inner surface can be omitted.

Furthermore, the flywheel may have passage recesses. In this way, the moment of inertia can be further reduced, and/or a further function, for example that of a fan impeller or an installation access means, can be realized.

The region of magnetically soft action may be an electrically inducible and/or magnetodynamically active region. The rotor, for example the region of magnetically soft action of the rotor, may have a laminate of ferromagnetic layers. The laminate of ferromagnetic layers may be designed to suppress eddy currents, at least perpendicular to the layers.

The passage openings may extend through the layers. The passage openings of the rotor may be in each case perpendicular to a plane of rotation of the flywheel and/or parallel to an axis of rotation of the crankshaft. The layers may be mutually parallel. The layers may be arranged perpendicular to the axis of rotation of the crankshaft. The passage openings may be perpendicular to the layers.

The ferromagnetic layers may be magnetically soft. The ferromagnetic layers may be formed by non-grain-oriented sheet. The laminate of ferromagnetic layers may be formed by a sheet bundle. The layers may be electrically insulated with respect to one another. The ferromagnetic layers may be insulated by way of phosphate coatings on their surface.

Alternatively or in addition, the fastening elements may be electrically insulated with respect to the layers. Owing to the insulation of the fastening elements, a short circuit of the layers and/or eddy currents through adjacent fastening elements can be suppressed. The fastening elements may be insulated with respect to the layers by way of a gap (for example an air gap) in the passage opening. Alternatively or in addition, insulating sleeves (composed for example of plastic) may be introduced into the cutouts, which sleeves electrically separate the electrical sheet from the fastening element.

The pin-like fastening elements may be arranged in each case in one of the passage openings. At the fastening points there may be provided in each case one internal thread. The fastening elements may include screws or threaded bolts. An external thread at an end, facing toward the associated fastening point, of the fastening element (first end) may engage with the internal thread. An end, averted from the associated fastening point, of the fastening element (second end) may have a screw head or an external thread which engages with a nut. Between a closure element and the screw head or the nut, there may be arranged a disc spring. Alternatively or in addition, the first end may be welded to the flywheel and/or the second end may be welded to the rotor. Alternatively or in addition, the fastening elements may comprise rivets.

The fastening points may be formed on projections. The flywheel may have mutually spaced-apart projections. The projections may extend parallel to the axis of rotation of the crankshaft. Each projection may form in each case one or more fastening points. For example, an abutment surface for the rotor may be provided on each projection, and/or a threaded bore for the internal thread may be formed in each projection. The projections may also be referred to as slugs.

Furthermore, the drivetrain module may include a closure element. The closure element may be arranged between the rotor and that end of the fastening element which is averted from the respective fastening point.

The closure element may be of ring-shaped form. The closure element may be formed in one piece. The closure element may be of closed ring-shaped form. The closure element may be of continuously encircling form.

Alternatively, the closure element may be formed in multiple pieces. The closure element may comprise mutually separate segments, for example ring segments. Each piece or segment of the closure element may be assigned to in each case one or more (e.g. adjacent) fastening points.

The closure element may bear areally against a side surface, averted from the flywheel, of the rotor. The side surface, averted from the flywheel, of the rotor may be perpendicular to the axis of rotation of the crankshaft. The closure element may cover that side surface of the rotor which is averted from the flywheel. A profile of the closure element may correspond to a profile of the side surface of the rotor. The profile of the closure element may be a contour (for example an outline) of the closure element, optionally without replicating a structure, situated within the external outline, of the side surface of the rotor. The contour of the closure element may correspond to a contour of the rotor, for example a contour of the rotor in a plan view parallel to the axis of rotation of the crankshaft and/or a contour of the rotor in a section plane perpendicular to the axis of rotation of the crankshaft. Alternatively or in addition, the closure element may be designed to correspond to the rotor in terms of shape in a section plane perpendicular to the axis of rotation.

The closure element may have machine-readable (or sensor-readable) markings. The markings may be arranged on a circumference of the closure element. The markings may be designed for the detection of a rotational movement and/or a rotational position of the closure element (or of the crankshaft connected rotationally conjointly thereto). The markings may be optically detectable, for example by way of reflection or transmission. The markings may be formed by cutouts and/or by an encircling toothing.

The markings may include a multiplicity of equidistant markings in an encircling arrangement. The multiplicity of equidistant markings in an encircling arrangement can permit a detection of multiple angular speeds within one rotation. Alternatively or in addition, it is possible for two adjacent markings to have a spacing which differs from the spacing of other adjacent markings. For example, the spacing of the two adjacent markings may be twice as great as the spacing between in each case all of the other adjacent markings. The different spacings of adjacent markings can permit a detection of the rotational position.

The fastening points may be arranged on a side surface, perpendicular to the axis of rotation of the crankshaft, of the flywheel. The fastening points may be arranged in an encircling manner, for example equidistant, on the flywheel. The fastening points may be arranged on a first pitch circle of the flywheel.

The fastening points may have abutment surfaces. The rotor, for example the sheet bundle, may bear against the abutment surfaces. The abutment surfaces of the multiplicity of fastening points may lie in a common first plane. The first plane may be parallel to the plane of rotation of the flywheel and/or perpendicular to the axis of rotation of the crankshaft.

Further fastening points may be arranged on the same side surface and/or on an opposite side surface of the flywheel. The fastening points for the rotor may differ from the further fastening points with regard to pitch circle radius and/or axial length. It is thus possible for the further fastening points of the flywheel to be accessible even when the rotor is fastened. For example, the further fastening points may be arranged on a second pitch circle. The radius of the first pitch circle may differ from the radius of the second pitch circle.

Alternatively or in addition, the fastening points for the rotor may be formed in first projections of the flywheel. The further fastening points may be formed in second projections of the flywheel. A first axial length of the first projections may differ from a second axial length of the second projections. For example, the further fastening points may have further abutment surfaces. The further abutment surfaces may lie in a second plane. The second plane may be parallel and offset with respect to the first plane. The axial lengths may be defined parallel to the axis of rotation of the crankshaft with respect to a plane of rotation of the flywheel. The further fastening points may be designed for rotationally conjoint connection to a clutch or to a gearbox.

Furthermore, cutouts, in particular circular cutouts, may be provided in the flywheel. These improve the accessibility for tools for making it possible to realize a screw connection of a gearbox.

According to a further aspect, a motor vehicle, in particular a utility vehicle, is provided, the drivetrain of which includes a drivetrain module according to the above in at least one of the design variants.

BRIEF DESCRIPTION OF THE FIGURES

Further features and advantages of the present disclosure will be described below with reference to the appended drawings, in which.

DETAILED DESCRIPTION

Figure 1B:
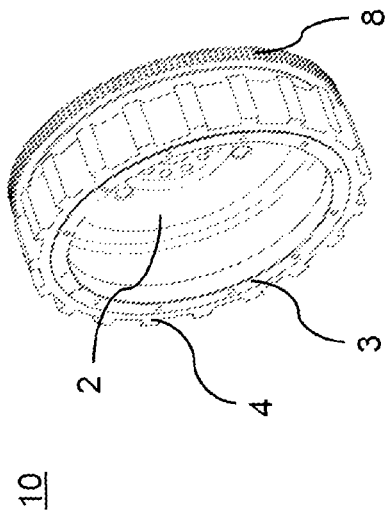
FIGS. 1A-1C show a sectional view and perspective illustrations of a drivetrain module known from the prior art.
Figure 1C:
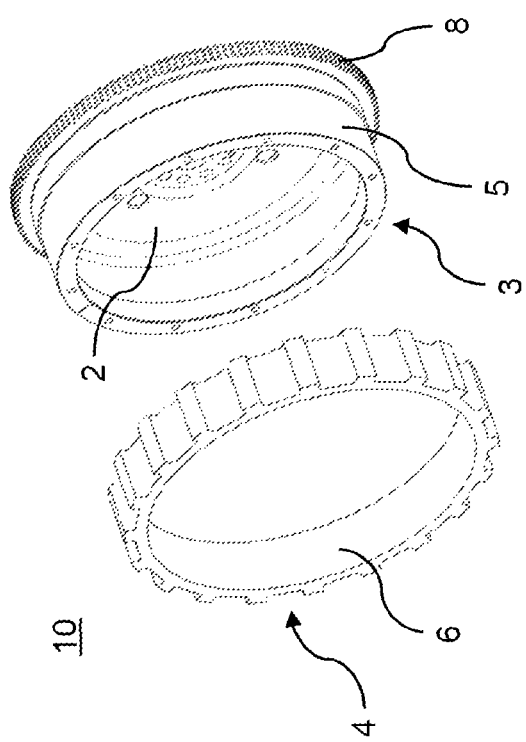
Figure 1A:
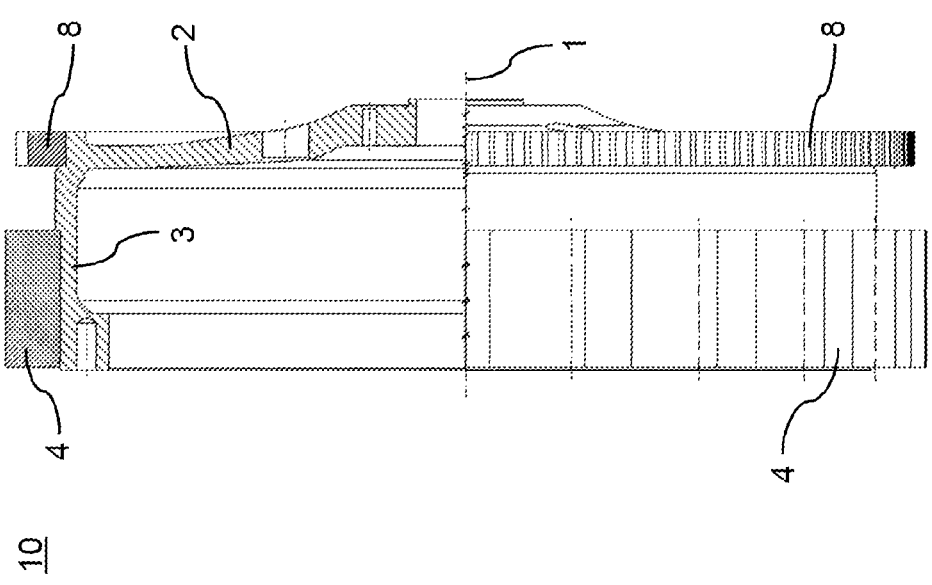
Figure 2:
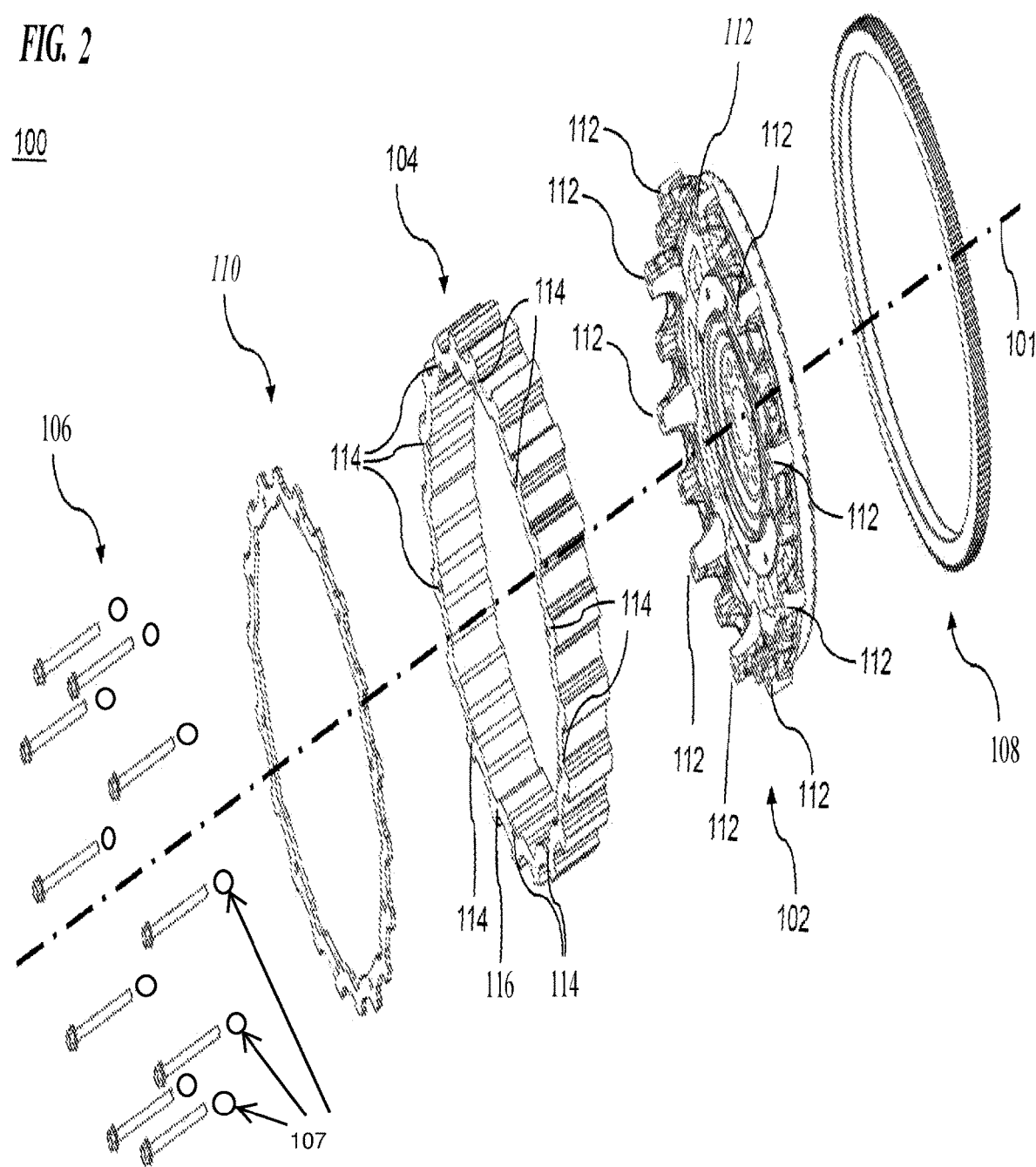
FIG. 2 shows an exploded illustration of a first exemplary embodiment of the drivetrain module.

FIG. 2 is an exploded illustration of an exemplary embodiment of a drivetrain module, denoted generally by the reference designation 100, for a motor vehicle. The module 100 includes a flywheel 102 and a rotor 104 for a crankshaft starter-generator.

The flywheel 102 of the drivetrain module 100 is connectable to a crankshaft. An axis of rotation of the crankshaft is denoted by the reference designation 101. The flywheel 102 has a multiplicity of fastening points 112.

In a region of magnetically soft action of a rotor 104 of the crankshaft starter-generator, passage openings 114 are provided so as to be spatially assigned to the fastening points 112. Fastening elements 106 are arranged in the passage openings 114. The fastening elements 106 are connected in each case at a first end, facing toward the associated connecting point 112, to the flywheel 102. At a second end averted from the flywheel 102, the pen-like fastening elements 106 transmit an axial tensile stress to a side surface 116, averted from the flywheel 102, of the rotor 104. The tensile stress holds the rotor 104 in contact with the flywheel 102, whereby the rotor 104 is connected rotationally conjointly to the flywheel 102.

The rotationally conjoint connection may be realized by way of a force fit owing to the tensile stress of the fastening elements 106. Alternatively or in addition, the pin-like fastening elements 106 anchored in the flywheel 102 may be arranged in positively locking fashion in the passage openings 114, for example by virtue of the pin-like connecting elements 106 being clamped in the passage openings 114.

The moment of inertia that arises from a web 3 and a fit surface 6 in the case of the conventional connecting technology is omitted. Furthermore, exemplary embodiments may be configured such that an additional mass of the fastening elements 106 is approximately equal to the mass reduction at the rotor 104 owing to the passage openings 114. In other words: the rotationally conjoint connection may be implemented virtually without adding to the moment of inertia.

The drivetrain module 100 optionally comprises a toothed ring 108 into which the pinion of an engaging starter engages. The engaging starter is preferably used for the cold start of the internal combustion engine, whereas an automatic start-stop system uses the crankshaft starter-generator at the end of a standstill phase of the motor vehicle. In this way, the crankshaft starter-generator may be connected exclusively to a short-term battery, for example for the purposes of feeding energy recuperated from braking processes and stored in the short-term battery to the automatic start-stop system and/or to the on-board electrical system when the engine is shut down. Without the engaging starter to which a feed is provided from a long-term battery (for example a lead battery), the short-term battery would have to be pre-charged from the long-term battery for the cold start. Furthermore, because a mechanical power demand for cold starting is higher than that for the automatic start-stop system, the crankshaft starter-generator can, by way of the additional engaging starter, be configured for relatively low mechanical power. In this way, it is likewise possible for the inertia moment arising from the crankshaft starter-generator to be reduced.

The drivetrain module 100 preferably comprises, at the gearbox side, a closure element 110. The closure element 110 is arranged between the second end, averted from the flywheel 102, of the fastening elements 106 and the rotor 104. The second ends of the fastening elements 106 bear against the closure element 110 and transmit the tensile stress to the closure element 110. A wall thickness and/or a hardness of the closure element 110 is determined such that the punctiform transmission of force of the fastening elements 106 is distributed as a uniform contact pressure to that side surface 116 of the rotor 104 which is averted from the flywheel 102.

Figure 3:
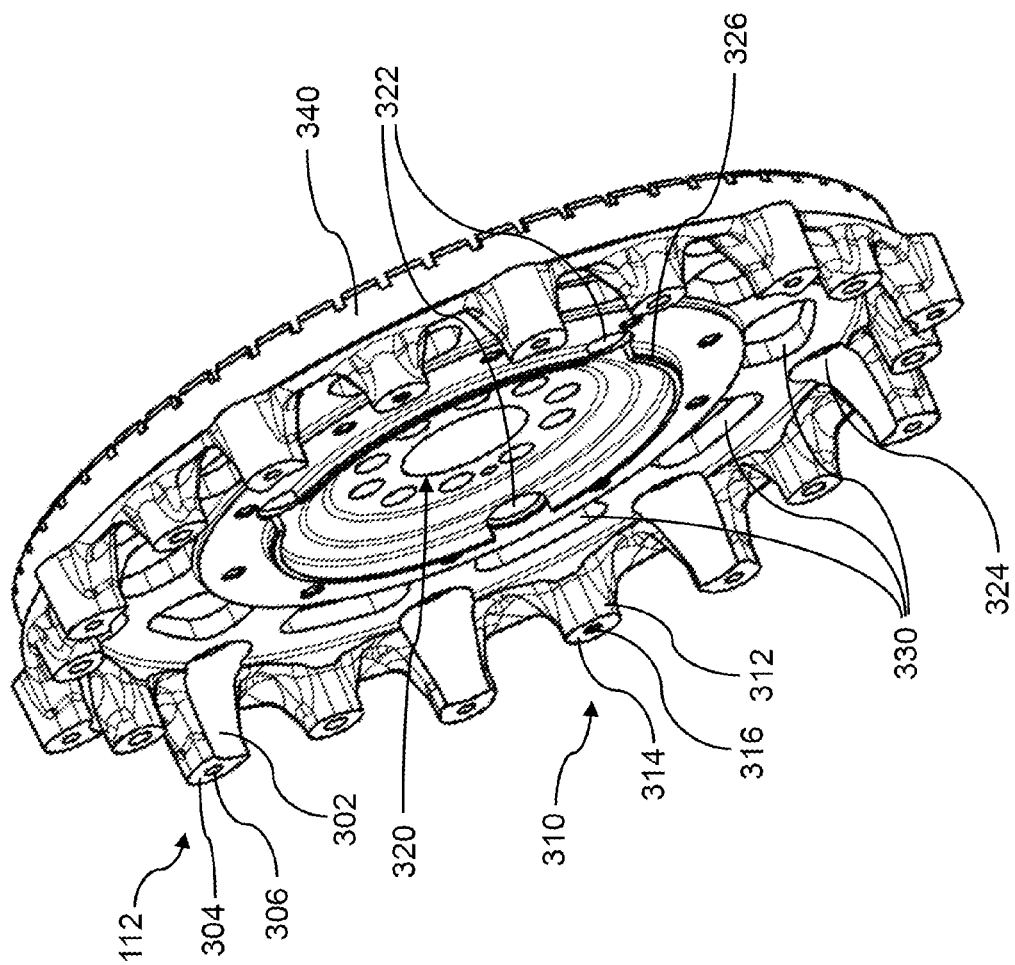
FIG. 3 shows a perspective illustration of an exemplary embodiment of a flywheel which can be used in each of the exemplary embodiments of the drivetrain module.

FIG. 3 is a perspective illustration of an exemplary embodiment of the flywheel 102. Each of the fastening points 112 is formed in each case on a projection 302 which extends parallel to the axis of rotation 101 from the flywheel 102. The projection 302 terminates with an abutment surface 304 which is perpendicular to the axis of rotation 101. A threaded bore which is parallel to the axis of rotation 101 and which has an internal thread 306 is formed in the abutment surface 304.

By way of the projections 302, the rotor 104 can be arranged so as to be spaced apart far enough from the flywheel 102 to interact with a stator. The moment of inertia arising from the rotating mass of a conventional web 3 is reduced by way of the mass, localized to the connecting points 112, of the projections 302.

Figure 4:
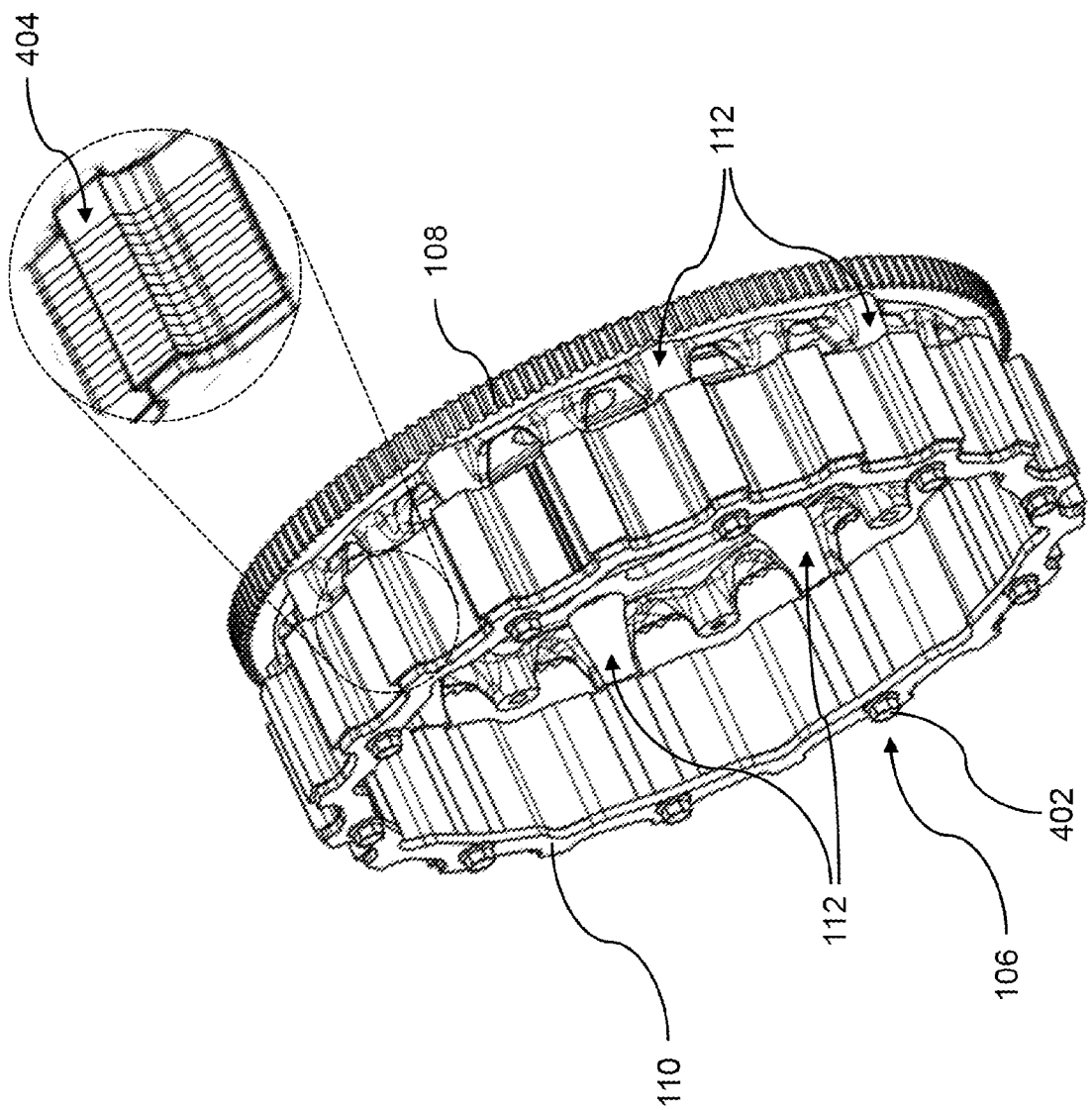
FIG. 4 shows a perspective illustration of the first exemplary embodiment of the drivetrain module.

FIG. 4 shows a first exemplary embodiment of the rotor 104 connected by way of the fastening elements 106 to the flywheel 102. In the exemplary embodiment shown in FIG. 4, screws serve as fastening elements 106, which screws each have a screw head 402 on the second end, averted from the flywheel 102, of the fastening elements 106. A tightening torque of the screws determines the tensile stress thereof, and thus the contact pressure.

At least the region of magnetically soft action of the rotor 104, for example the entire rotating rotor denoted by the reference designation 104, is preferably constructed from ferromagnetic layers 404 which are electrically insulated with respect to one another by way of non-conductive intermediate layers for the purposes of suppressing eddy current losses. In one exemplary embodiment, the ferromagnetic layers 404 are adhesively connected by way of the intermediate layers to form a laminate of ferromagnetic layers 404. An example for the laminate of ferromagnetic layers 404 is a sheet bundle, the magnetically soft layers of which are manufactured from dynamo sheet. In an alternative exemplary embodiment, the layers 404 are not connected by the intermediate layers, and are connected in non-positively locking fashion by way of the tensile stress of the fastening elements 106.

The rotor 104 constructed from ferromagnetic layers 404 is advantageously connected to the flywheel 102 using the closure element 110. Owing to the uniform contact pressure of the closure element 110, a bending-up of the layers 404 connected in non-positively locking fashion, or a breakaway of the adhesively connected layers 404 between adjacent fastening elements 106, is prevented, for example after the screws have been tightened. Alternatively, the layers 404, or at least a first one of the layers 404, may be formed with a sufficient wall thickness, and/or the connection of the layers 404 may be formed with a sufficient strength, that the closure element 110 can be dispensed with.

The individual ferromagnetic layers 404 of the rotor 104 may be cut out of sheet rolls by punching. Owing to the direct connection of flywheel 102 and rotor 104, no additional outlay arises during the production of the layers 404 of the rotor 104, because the additional holes can be formed into the individual layers (for forming the passage openings 114) in the same punching process. By virtue of the fact that no fit surface 6 is required on the radially inner surface of the rotor 104, the production of the rotor 104 is simplified in relation to the conventional rotor 4. For example, because the fit surface 6 is omitted, tolerances in the production of the layers 404 can be enlarged. This results in less material waste. Furthermore, one punching tool can be used for more punching processes before it has to be changed as a result of wear.

Through the omission of the conventional web 3, further improvements can be attained. For example, a larger area of the flywheel 102 is accessible at the gearbox side as a connecting interface for further components, for example for a gearbox adapter. In addition to the fastening points 112 for the rotor 104, the exemplary embodiment of the flywheel 102 shown in FIG. 3 has further fastening points 310. Each of the further fastening points 310 is formed by a separate, further projection 312 which terminates with a further abutment surface 314 which is perpendicular to the axis of rotation 101. A threaded bore which is parallel to the axis of rotation 101 and which has a further internal thread 316 is formed in the further abutment surface 314.

Figure 5:
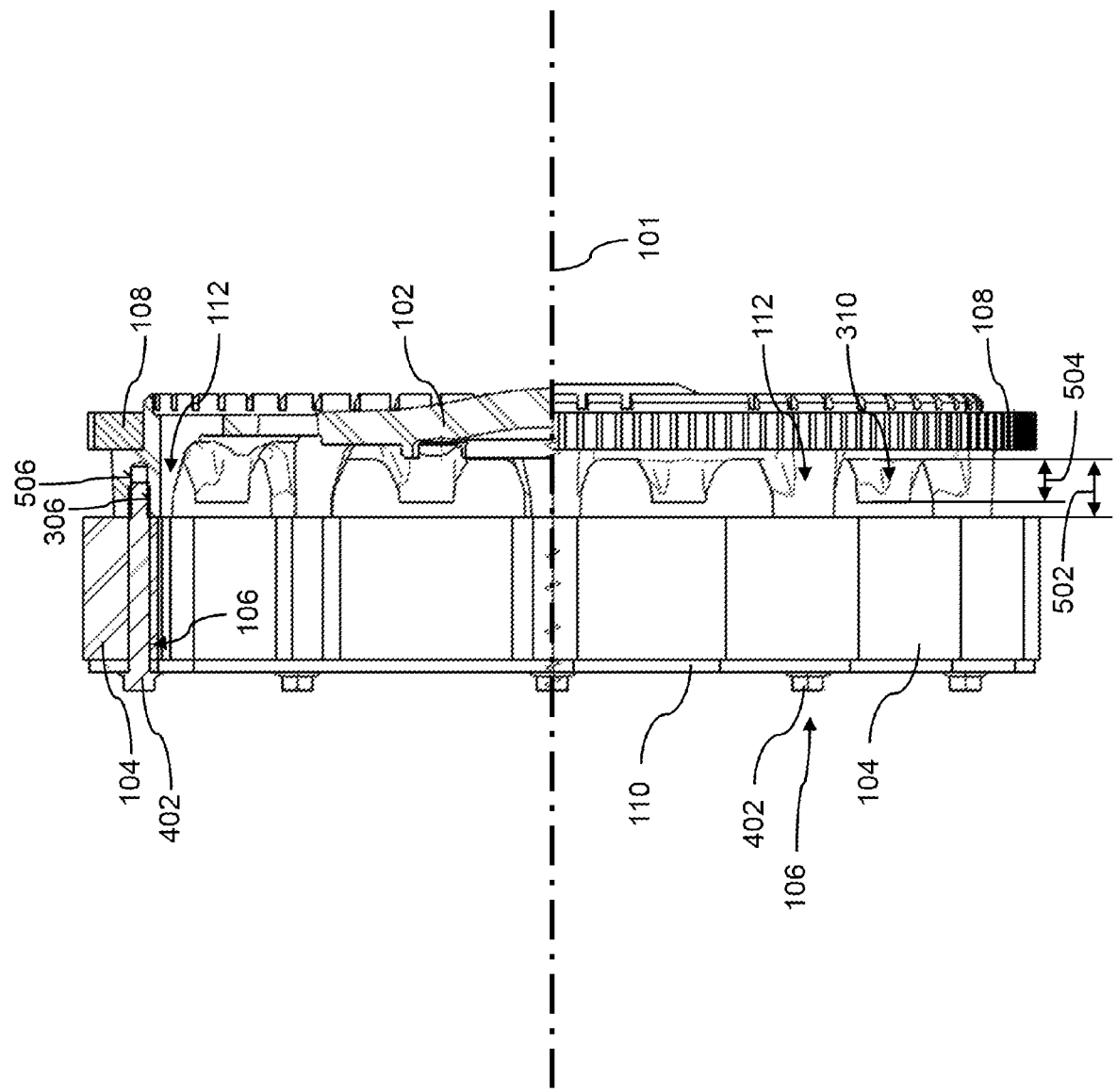
FIG. 5 shows a radial partial section of the first exemplary embodiment of the drivetrain module.

FIG. 5 shows, in the upper half of the figure, a radial subsection, which is parallel to the axis of rotation 101, of the first exemplary embodiment of the drivetrain module 100. The corresponding view of the drivetrain module 100 is shown in the lower half of the figure. A first axial length 502 of the projections 302 for the rotor 104 is greater than a second axial length 504 of the further projections 312. As a result, the connecting interface formed by the further fastening points 310 lies in a dedicated plane between the flywheel 102 and the rotor 104.

For a compact structural form of a drivetrain arrangement with a gearbox and the drivetrain module 100, the gearbox adapter, connected to the further fastening points 310, of the gearbox is arranged entirely in the interior space of the rotor 104.

An external thread 506 on the first end, facing toward the connecting point 112, of the fastening element 106 engages into the internal thread 306. A screw head 402 on the second end, averted from the connecting point 112, of the fastening element 106 lies against the closure element 110. A disc spring 107 is preferably arranged, in each case between screw head 402 and closure element 110, on the fastening element 106 in order to further increase the contact pressure.

Alternatively or in addition to the axial length, the connecting interfaces formed by the further fastening points 310 differ from the connecting interface for the rotor 104 with regard to a pitch circle diameter of the fastening points 112 and of the further fastening points 310.

Figure 6:
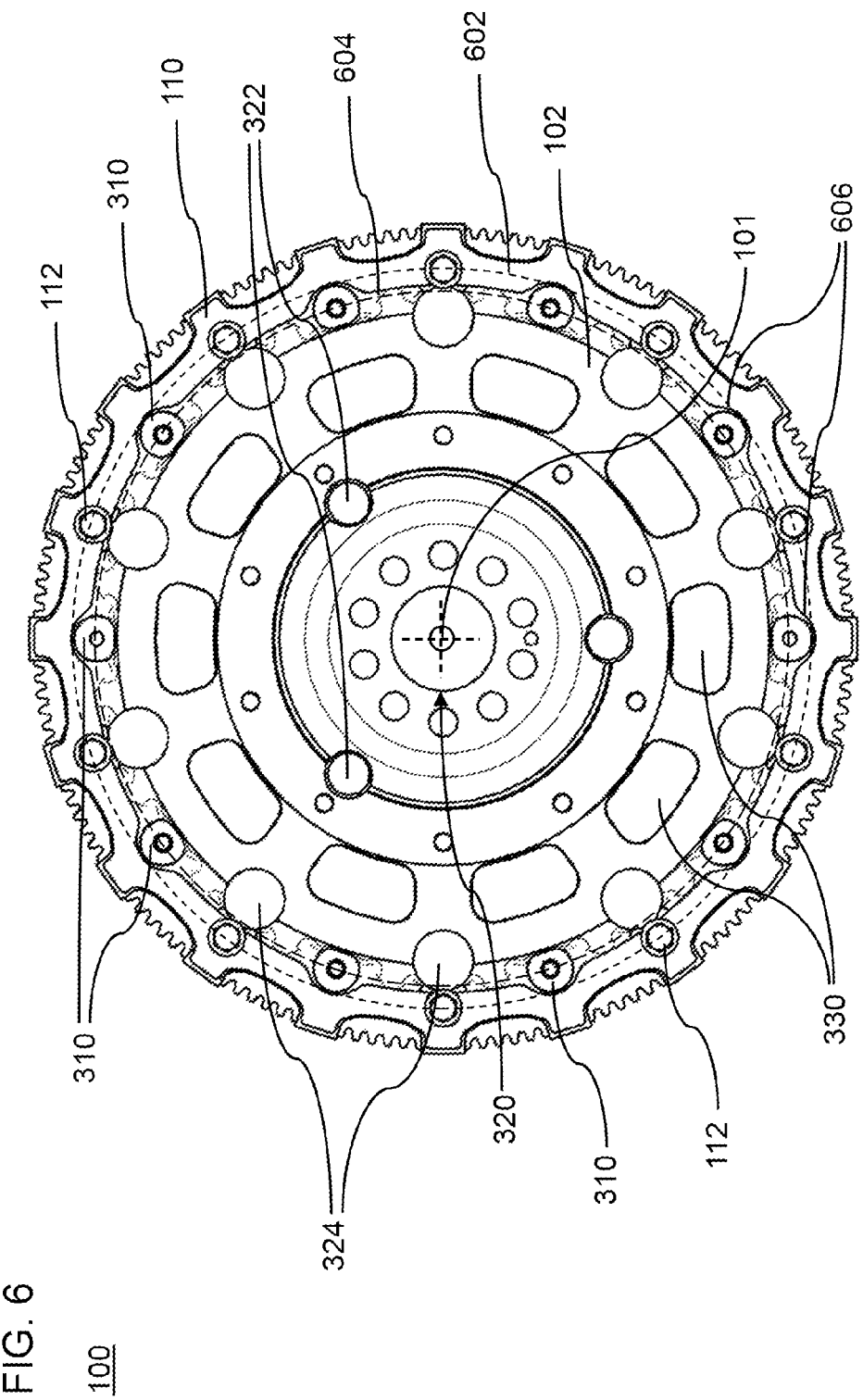
FIG. 6 shows an axial view of the first exemplary embodiment of the drivetrain module.

FIG. 6 shows a view, from the gearbox side, of the drivetrain module 100. The plane of the image of FIG. 6 is perpendicular to the axis of rotation 101 of the crankshaft. The fastening points 112 are arranged equidistantly on a first pitch circle 602. The further fastening points 310 are arranged equidistantly on a second pitch circle 604. A first pitch circle diameter of the first pitch circle 602 is larger than a second pitch circle diameter of the second pitch circle 604.

A profile of the closure element 110 in the view in the direction of the axis of rotation 101 is congruent with the side surface 116 that is to say with a profile of the rotor 104 in the gearbox-side view in the direction of the axis of rotation 101. In this way, the uniform contact pressure can be realized with minimal usage of material.

The fastening points 112 and the further fastening points 310 are preferably arranged alternately in an encircling manner, such that in each case one further fastening point 310 is arranged between two adjacent fastening points 112. The profile of the rotor 104 and of the closure element 110 deviates from a circular line, so as to form cutouts 606, at the further fastening points 310. By way of the cutouts 606, the further abutment surfaces 314 of the further fastening points 310 are accessible from the gearbox side.

The crankshaft can be screwed, at a hub 320 shown in FIGS. 3 and 5, to the flywheel 102. Circular passage recesses 322 and 324 in the flywheel 102 are formed in on pitch circles outside the hub 320 and serve for accessibility for a tool, for example for the purposes of realizing a screw connection of a gearbox to the flywheel 102. Furthermore, the passage recesses 322 and 324 contribute to the further reduction of the moment of inertia. Optionally, the flywheel 102 has further passage recesses 330 for reducing the moment of inertia.

An encircling or substantially encircling surface 326 projects in the axial direction from the flywheel 102. The surface 326 permits the centring of a component, for example a gearbox adapter, which is fastened to the flywheel.

The toothed ring 108 is fastened in frictionally locking fashion to a press-fit seat 340 shown in FIG. 3.

Figure 7:
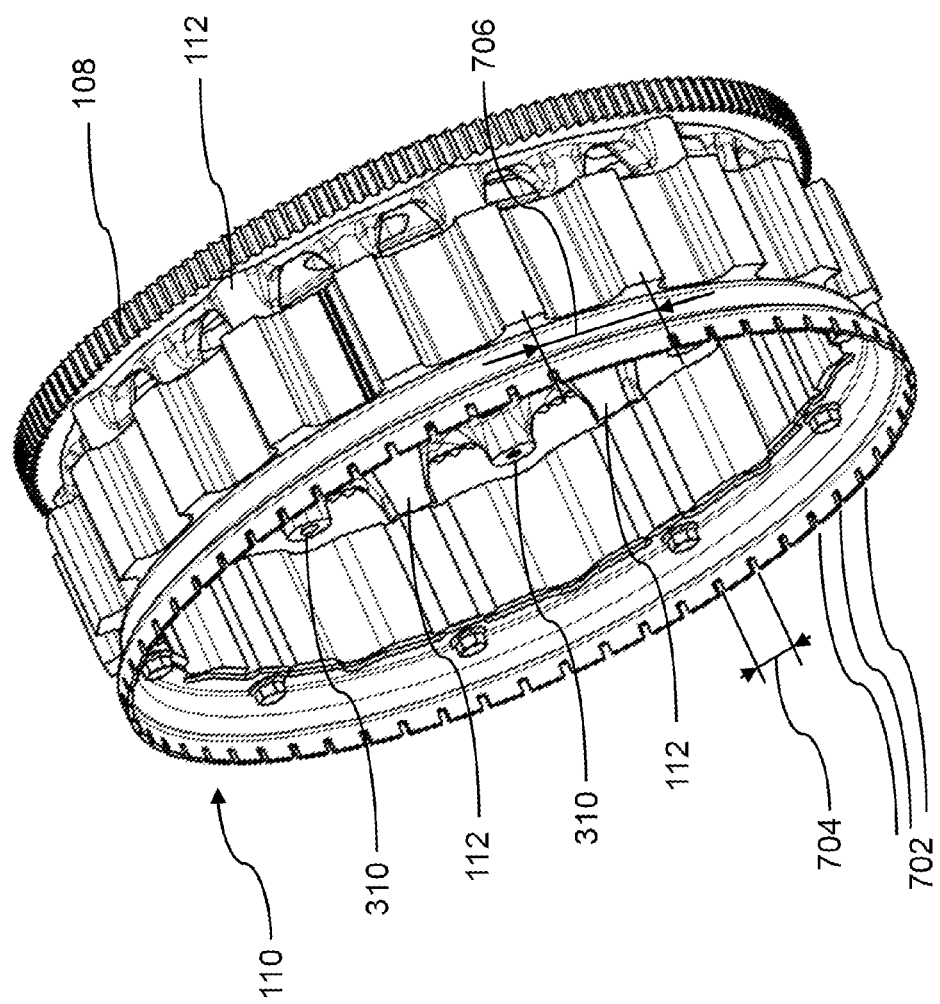
FIG. 7 shows a perspective illustration of the second exemplary embodiment of the drivetrain module.

FIG. 7 shows a second exemplary embodiment of the drivetrain module 100. Corresponding features are denoted by the same reference designations. The description and optional refinement thereof in conjunction with the first exemplary embodiment apply correspondingly to the second exemplary embodiment.

Markings 702 are applied to an encircling ring on the closure element 110, which markings can be detected contactlessly by a rotational speed sensor. In the exemplary embodiment shown in FIG. 7, the markings are cutouts in a cylinder wall. The rotational speed sensor comprises a forked light barrier, the radial light profile of which is interrupted by the cylinder wall.

The markings 702 encode both rotational speed and rotational position of the closure element 110 (and of all components of the drivetrain module 100 connected rotationally conjointly thereto). For this purpose, adjacent markings 702 are arranged with a uniform first circumferential spacing 704. Only one pair of adjacent markings 702 is arranged with a second circumferential spacing 706 which deviates from the first circumferential spacing 704.

In the exemplary embodiment shown in FIG. 7, the second circumferential spacing 706 is at least two times the first circumferential spacing 704. The second circumferential spacing 706 is advantageously not an integer multiple of the first circumferential spacing 704, such that the occurrence of the second circumferential spacing 706 can be distinguished from an erroneously absent signal.

Owing to the multiplicity of markings 702 with the first circumferential spacing 704, the rotational speed (or angular speed) can be detected with a time resolution of a fraction of one rotation period. Owing to the single marking pair with the second circumferential spacing 706, the rotational position can be unequivocally determined upon the occurrence of a relatively long signal sequence corresponding to the second circumferential spacing 706.

Figure 8:
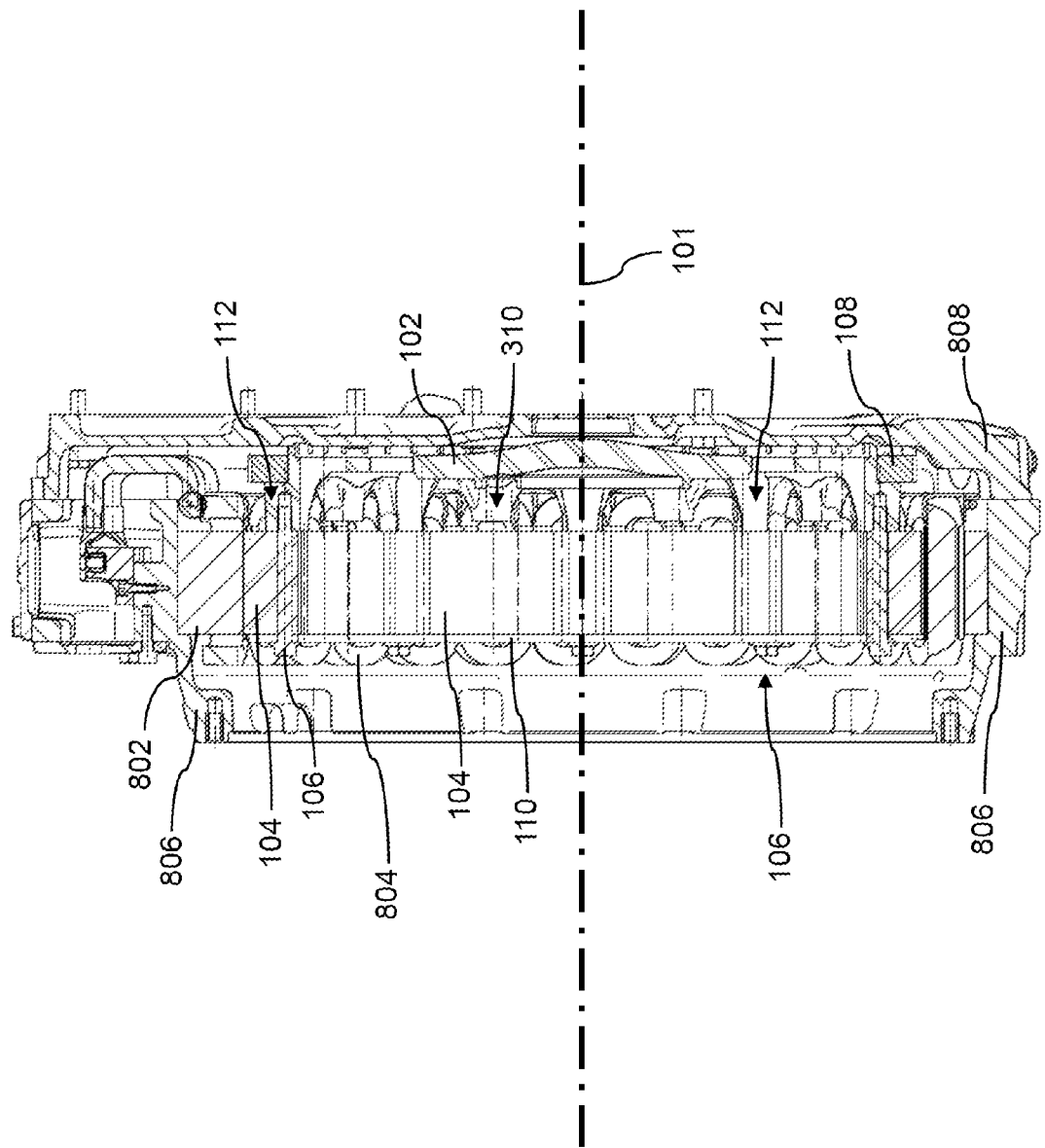
FIG. 8 shows a radial section of an exemplary embodiment of a drivetrain component with the first exemplary embodiment of the drivetrain module.

FIG. 8 shows a section, parallel to the axis of rotation 101, through a drivetrain component 800. The drivetrain component 800 comprises the rotating drivetrain module 100. The rotating drivetrain module 100 and a stator 802 are arranged in a housing. Stator coils 804 of the stator 802 are arranged outside the rotor 104 so as to encircle the latter. The housing comprises a stator housing part 806 and a flywheel housing part 808.

During generator operation, the rotor 104 induces a voltage in the stator coils 804. A current which is driven by the voltage charges a short-term battery. During starter operation, the short-term battery feeds a current into the stator coils 804, the magnetic field of which magnetizes the region of magnetically soft action of the rotor 104 and generates a torque.

Whereas above exemplary embodiments use a closure element 110 of closed ring-shaped form, the closure element 110 may also be formed of multiple pieces, for example for the purposes of realizing a further mass reduction.

As has been illustrated on the basis of above exemplary embodiments, weight and moment of inertia can be reduced. Mechanical machining of the flywheel may be simplified by virtue of a press-fit surface being omitted.

Different embodiments of the closure element make it possible for additional functionalities to be integrated. Further interfaces may be integrated on the flywheel, in particular in the region of the attachment of the rotor, for example for the purposes of realizing a compact structural form.

The production of the rotor can be simplified because the fit surface is omitted.

Even though the present disclosure has been described with reference to exemplary embodiments, it is clear to a person skilled in the art that various alterations may be made and equivalents used as substitutes. Furthermore, numerous modifications may be made in order to adapt a particular situation or a particular material to the teaching of the present disclosure. Consequently, the present disclosure is not restricted to the exemplary embodiments disclosed, but rather encompasses all exemplary embodiments that fall within the scope of the appended patent claims.

LIST OF REFERENCE DESIGNATIONS 1, 101 Axis of rotation of the crankshaft
2, 102 Flywheel
3 Web
4, 104 Rotor
5 Press-fit seat for rotor
6 Fit surface
106 Fastening elements
8, 108 Toothed ring
110 Closure element
112 Fastening point
114 Passage opening
302 Projection
304 Abutment surface
306 Internal thread
310 Further fastening point
312 Further projection
314 Further abutment surface
316 Further internal thread
320 Hub for crankshaft connection
322, 324 Passage recesses for tool
326 Surface for centring
330 Passage recesses for mass reduction
340 Press-fit seat for toothed ring
402 Screw head
404 Laminate of ferromagnetic layers
502 First axial length
504 Second axial length
506 External thread
602 First pitch circle
604 Second pitch circle
606 Cutouts for further fastening point and/or tool accessibility
702 Markings for rotation detection
704 First marking spacing
706 Second marking spacing
800 Drivetrain component
802 Stator
804 Stator coils
806 Stator housing
808 Flywheel housing

What is claimed:

1. A drivetrain module for a motor vehicle, comprising:
   a flywheel connectable to a crankshaft, the flywheel including a multiplicity of fastening points;
   a crankshaft starter-generator which includes a rotor, wherein, in a region of magnetically soft action of the rotor, a multiplicity of passage openings is arranged in each case so as to be spatially assigned to the fastening points of the flywheel, through which passage openings pin-like fastening elements interact with the respectively assigned fastening points for the purpose of rotationally conjointly connecting the rotor and flywheel; and
   a closure element arranged between the rotor and an end of the fastening element;
   wherein the closure element comprises mutually separate segments which are assigned to in each case one fastening point.

2. The drivetrain module according to claim 1, wherein at least the region of magnetically soft action of the rotor has a laminate of ferromagnetic layers, and the passage openings extend through the layers.

3. The drivetrain module according to claim 2, wherein the laminate of ferromagnetic layers is formed by a sheet bundle.

4. The drivetrain module according to claim 2, wherein the layers are electrically insulated with respect to one another and the fastening elements are electrically insulated with respect to the layers.

5. The drivetrain module according to claim 1, wherein the fastening points have in each case an internal thread, and the fastening elements comprise screws which are arranged in the passage openings and which engage into the internal thread of the associated fastening points.

6. The drivetrain module according to claim 1, wherein the flywheel has mutually spaced-apart projections in which in each case at least one fastening point is formed.

7. The drivetrain module according to claim 1, wherein the closure element bears against a side surface, averted from the flywheel, of the rotor.

8. The drivetrain module according to claim 1, wherein a profile of the closure element corresponds to a profile of the side surface.

9. The drivetrain module according to claim 1, wherein the end of the respective fastening element which is averted from the fastening point has a screw head and a disc spring is arranged between the screw head and the closure element.

10. The drivetrain module according to claim 1, wherein the closure element has encircling markings for the detection of a rotational movement or of a rotational position.

11. The drivetrain module according to claim 1, wherein the fastening points are arranged in encircling fashion on the flywheel.

12. The drivetrain module according to claim 1, wherein the fastening points are arranged on a first pitch circle of the flywheel.

13. The drivetrain module according to claim 12, wherein the flywheel has further fastening points on a second pitch circle and the radius of the first pitch circle differs from the radius of the second pitch circle.

\* \* \* \* \*